Jan. 7, 1969 E. C. UHRENHOLDT 3,420,765

SELF-FEEDING ANODE PROBE FOR REDUCTION CELL

Filed April 29, 1965

INVENTOR.
EUGENE C. UHRENHOLDT
BY
Glenn, Palmer & Matthews
attorneys

United States Patent Office 3,420,765

Patented Jan. 7, 1969

3,420,765

SELF-FEEDING ANODE PROBE FOR REDUCTION CELL

Eugene Clifford Uhrenholdt, Henrico County, Va., assignor to Reynolds Metals Company, Richmond, Va., a corporation of Delaware Filed Apr. 29, 1965, Ser. No. 451,775

U.S. Cl. 204—195 8 Claims

Int. Cl. B01k *3/02*

ABSTRACT OF THE DISCLOSURE

A probe for measuring the cell voltage of a reduction cell wherein the probe passes through the anode and is consumed as the anode is lowered into the electrolyte thereby alleviating the necessity of having a sliding contact between the anode and the probe. The probe is in positive electrical contact with the electrolyte ad the lower end of the anode.

This invention relates to a self-feeding anode wire probe for use in measuring pot voltage in a reduction cell. More specifically, although not limited thereto, this invention relates to a self-feeding anode wire probe for measuring the voltage drop across an aluminum reduction cell having a self-baking anode modified to permit access to the electrolyte by the probe.

While it is common practice to measure the voltage drop across a reduction cell in the aluminum production industry, no one, as far as known to me, has eliminated the carbon anode from the measurement with a probe that is self-feeding. Probes contacting a liquid, of course, are known; see, for example the U.S. Patent 1,961,893 to Wadman et al., and the U.S. Patent 2,843,823 to Bayless. In contrast tot he prior art this invention provides a self-feeding instulated probe that permits a good electrical contact with the electrolyte and hence an accurate measurement of the pot working voltage between the anode and cathode faces of an aluminum reduction cell.

The primary object of the invention is the provision of means to measure the working voltage in a reduction cell.

Another major object of the invention is to provide an anode probe that is self-feeding and which is insulated from the major portion of the anode.

Yet another object is to provide an insulated probe for a reduction cell wherein the insulation in contact with anode paste in the cell provides a positive electrical contact with the baked portion of the anode when the paste is sufficiently carbonized through the baking action and with the molten electrolyte at the bottom end of the wire probe to provide a positive electrical contact with the bath both directly and through the baked anode carbon.

Still another object is to provide an insulated self-feeding probe which is consumed with the anode and which eliminates sliding contacts ordinarily required with a movable anode.

Other objects and advantages will clearly appear from a description of a preferred embodiment as shown in the accompanying drawing, in which.

One of the disadvantages of measuring the pot voltage across a reduction cell is that the measurement includes the voltage drop across the anode itself. In this invention this is avoided by providing a probe that measures the voltage drop from the working face of the anode to the cathode through the electrolyte. Moreover, as the anode is consumed in the reduction process, the probe is similarly consumed but this is compensated for by the self-feeding feature of the probe regardless of how far the anode is moved upward or downward by the pot operator. In this regard, it has been customary to provide a sliding contact between the probe and external measuring devices. However, this invention eliminates such sliding contacts and the difficulties attendant thereto, e.g., contact resistance.

Figure 1:
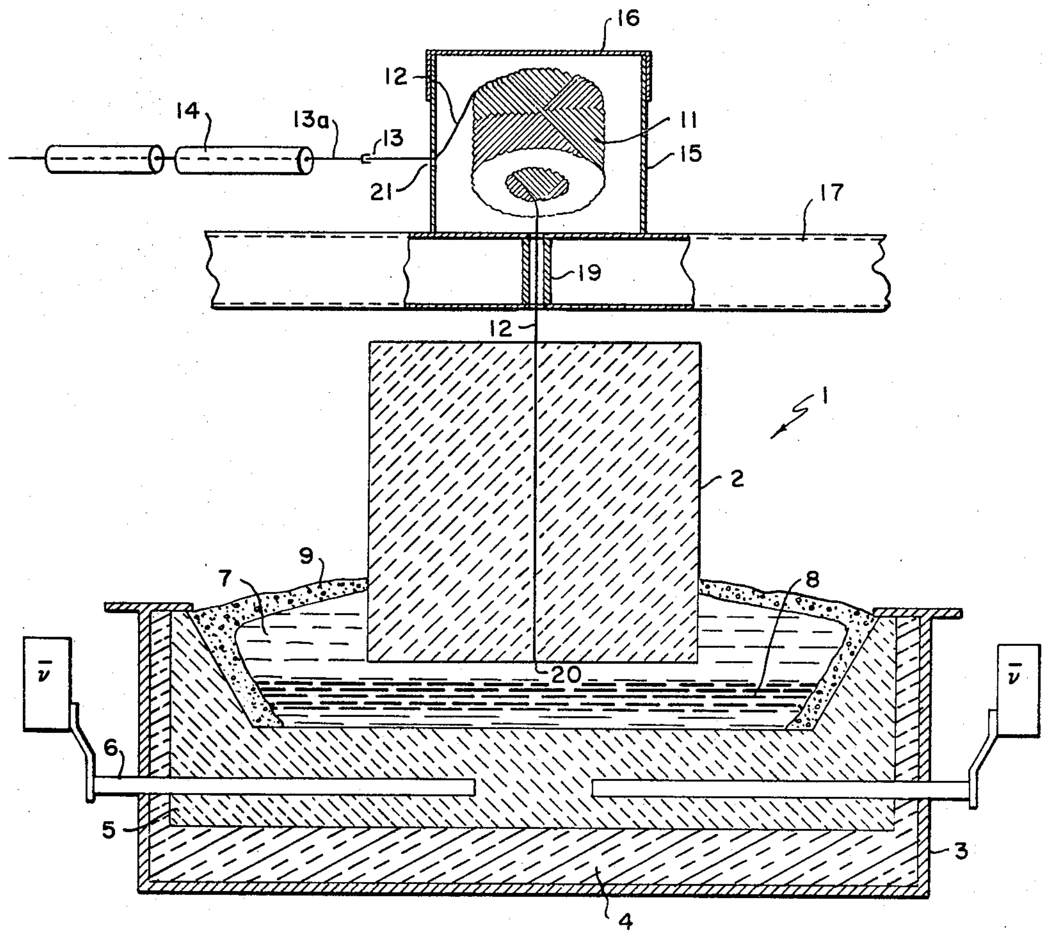
FIG. 1 shows the self-feeding probe in combination with a reduction cell.

FIG. 1 illustrates a conventional aluminum reduction cell, generally indicated by the numeral 1, modified to accommodate the instant invention. The cell comprises a steel box 3 lined with thermal insulation 4 and further lined with a conventional carbon lining 5. Steel cathode bars 6 connected to the negative side of a power supply extend through the steel box 3, the thermal insulation 4, and into the carbon lining 5. The molten aluminum 8 above the carbon lining 5 constitutes a part of the cathode. The cell contains the usual electrolyte of molten cryolite 7 and the crust 9. For the sake of simplicity the mechanism to raise and lower the self-baking anode 2 and the alumina feeding machinery have been omitted from the drawing. The conventional pot beam 17 has been modified to provide holes 18, say two inches in diameter, therethrough for the passage of the probe wire 12 which may be number 10 asbestos-covered stove wire. As seen in FIG. 1 a wire guide 19 may be located in the pot beam, and also a probe wire housing 15 with lid 16 is provided on the upper part of pot beam 17. The probe wire housing may be made of 11-gauge steel. Within the housing 15 there is placed a wire ball 11 from whence the wire 12 feeds the probe as required from the inside of the ball by the movement of the anode 2. After passing through the hole 21 in the housing 15 the distal end of the wire 12 is connected to a conductor or wire 13*a* by a connector 13 whereby a solid electrical connection is made rather than the usual sliding contact. From the connector 13 the wire 13*a* passes through a conduit 14 to a conventional measuring instrument (not shown) connected between the wire 13*a* and the cathode 6.

When the face of the anode 2 is eroded, primarily by the formation of carbon dioxide caused by the combination of oxygen liberated at the surface of the anode blocks with the carbon of the anode, the anode must be periodically lowered to maintain electrical contact with the electrolyte and a proper working voltage for the pot. When the anode is lowered the wire 12 is pulled from the inside of the wire ball 11 and is, therefore, self-feeding. The asbestos covering on the wire 12 effectively insulates the wire 12 from the housing 15, the pot beam 17, the wire guide 19, and the unbaked portion of the carbon anode 2.

That portion of the asbestos covered wire 12 at the face of the anode 2 indicated by numeral 20 contacts the molten electrolyte 7 and electrical contact is made with the baked portion of the anode (for perhaps 20" in length) which also electrically contacts the molten electrolyte, thus assuring a good electrical contact in either case. The baked anode firmly attaches to the probe wire 12 and pulls it down whenever the anode is adjusted downward to compensate for burned-off carbon during the pot operation.

Figure 2:
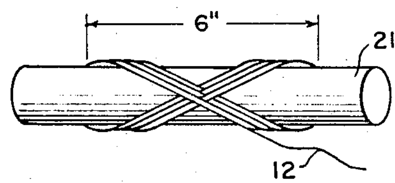
FIG. 2 illustrates a method of making the wire ball whereby the self-feeding feature is obtained.

The wire ball may be conveniently made (see FIG. 2) by winding approximately 50 feet of asbestos-covered copper wire on a three-inch mandrel 21 using about six inches of mandrel length. This length of wire will make a ball about six inches high and six inches outside diameter to fit into the probe wire housing. As shown in FIG. 1 the wire 12 is fed from the inside of the ball thereby eliminating any necessity for having sliding contact with an external device and permitting a solid connection at 13. This arrangement also allows operation of the pot for at least two years at which time replacement by a new ball of wire is easily accomplished.

There has been shown and described a self-feeding anode wire probe for measuring the voltage drop across an aluminum reduction cell having numerous advantages, e.g., self-feeding with the lowering of the anode, providing positive electrical contact with the electrolyte, eliminating the necessity for a sliding contact with external devices, and being simple and inexpensive to make and install.

While for purposes of description I have shown and described a specific embodiment of my invention, it will be apparent that changes and modifications can be made therein without departing from the spirit of my invention or the scope of the appended claims.

I claim:

1. In a reduction cell of the self-baking anode type having a movable anode, a voltage probe comprising an insulated probe passing through said anode and in electrical contact with at least the baked region of the anode, said probe being payed out as the anode is moved, and an electrical connection between the distal end of the probe and an external conductor.

2. The voltage probe in accordance with claim 1 wherein the probe is copper and wherein the insulation is asbestos.

3. In a reduction cell of the self-baking anode type having an electrolyte, an anode, and a cathode, the improvement comprising an insulated anode probe passing through and movable integrally with the anode, the probe being in electrical contact with at least the end of the anode which is adjacent to the electrolyte-anode interface, and said probe being adapted for determining the cell voltage at said interface.

4. The combination in accordance with claim 3 wherein the probe is a wire which is covered with an insulating material.

5. The combination in accordance with claim 4 wherein said insulating material is asbestos.

6. The combination in accordance with claim 4 wherein said wire is copper and covered with asbestos.

7. The combination in accordance with claim 4 wherein the end of the probe which is located adjacent the electrolyte-anode interface is adapted to be contacted by the electrolyte and by the baked anode thereby ensuring a positive electrical contact between the probe and the electrolyte.

8. The combination in accordance with claim 3 further comprising an external conductor, and a solid connection between said external conductor and the distal end of the probe.

References Cited

UNITED STATES PATENTS

| | | | |
|---|---|---|---|
| 2,378,761 | 6/1945 | Forsberg | 204—243 |
| 3,055,812 | 9/1962 | Andersson | 204—225 |
| 3,141,835 | 7/1964 | Rolin et al. | 204—1.1 |
| 3,317,413 | 5/1967 | Chambran | 204—245 |

ROBERT K. MIHALEK, *Primary Examiner.*

T. TUNG, *Assistant Examiner.*

U.S. Cl. X.R.

204—206; 225; 243; 245; 67